Jan. 3, 1961  W. A. WILLIAMSON  2,967,074
AXLE AND WHEEL MOUNTING
Filed May 22, 1959
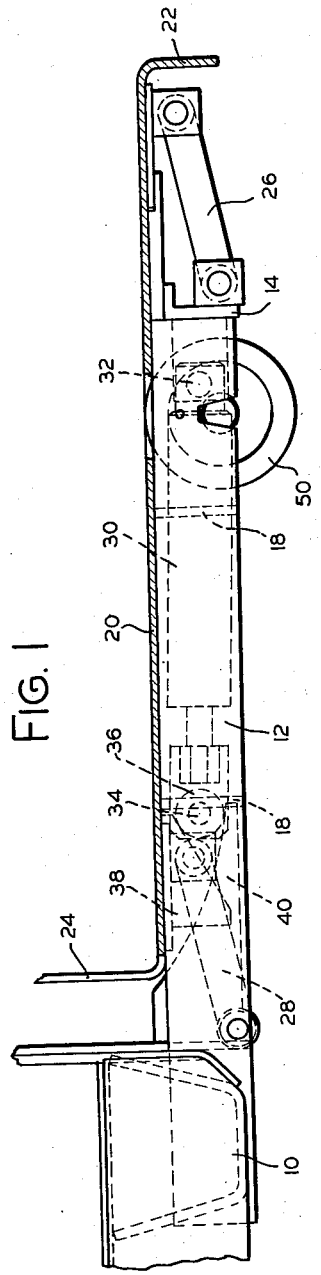
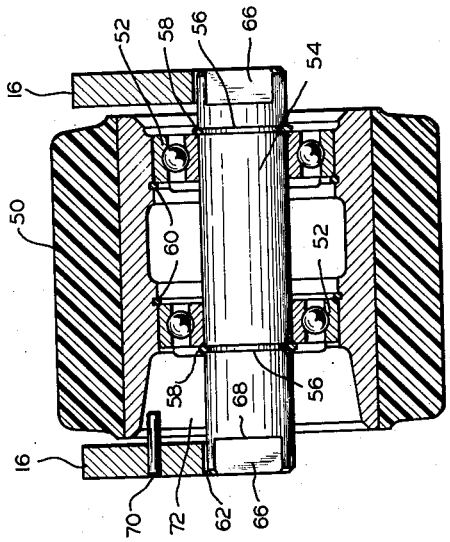
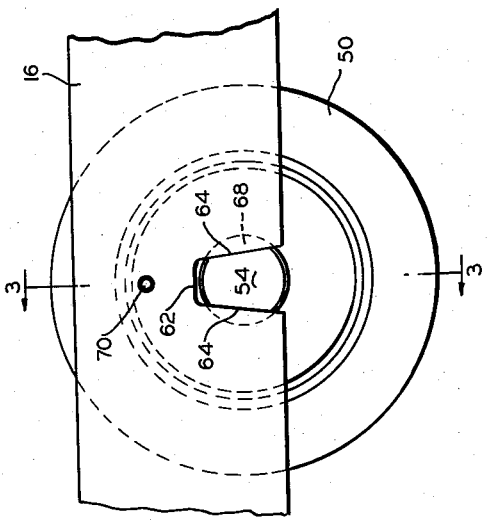
*INVENTOR.*
WILLIAM A. WILLIAMSON
BY
ATTORNEY United States Patent Office 2,967,074
Patented Jan. 3, 1961

2,967,074
AXLE AND WHEEL MOUNTING

William A. Williamson, Battle Creek, Mich., assignor to Clark Equipment Company, a corporation of Michigan Filed May 22, 1959, Ser. No. 815,029

10 Claims. (Cl. 301—125)

This invention relates to the mounting of non-traction axle-wheel assemblies on vehicles.

In certain types of material handling machines, and especially lift trucks of the variety known as hand or "wake" lift trucks, one of two constructions has been generally used heretofore in mounting non-traction or trail wheel axles for supporting one end of the truck. In one construction the main frame members are located inboard of the wheels. A long axle shaft extends through the frame members such that each end portion of the axle extends transversely outwardly from one of the frame members and has mounted thereon one of the trail wheels. The wheels are installed by inserting them over opposite ends of the axle shaft and are retained on the axle shaft by snap rings or lock nuts. Thus, each wheel is cantilevered on the axle. Two disadvantages appear in the use of this construction, viz, the relative weakness of the cantilever axle as compared with a double end mounted axle, and difficulties experienced in servicing and maintenance as explained below. As will be apparent to persons familiar with the art the latter construction does not permit the axle and wheel assembly to be removed as a unit from the vehicle. In the event of corrosion between the axle and wheels the wheels must be driven from the axle by means of hardened tools with the machine in an overturned position. It has been found in practice that even a moderate amount of corrosion often makes it extremely difficult, or even impossible in the event of considerable corrosion, to thus remove the wheels, and it is often necessary to cut the axle out of the frame which, of course, severely damages the frame.

The other construction which has been rather widely used utilizes frame members which are arranged in pairs on opposite sides of each trail wheel. One short axle is provided for each wheel and is supported between each pair of frame members. The axle is inserted into the wheel and held in position by means of snap rings, for example, and the entire assembly is then placed in the frame from below. The lower portions of the frame members are formed to duplicate the curved upper part of the axle. Retainer block members which are cut out to duplicate the curved lower part of the axle are placed on the axle and bolted to the frame so as to clamp the axle to the frame. Thus, the axle cannot rotate within the frame as the wheel rotates upon the axle. The latter construction has certain advantages over the former in that it is more rugged structurally than is the cantilever mounting, and in the event of slight corrosion it is possible to remove the axle and the wheel from the vehicle as a unit by removing the bolts from the retaining block members which permits the axle to drop out of the frame. However, it has been found that in cases of severe corrosion the clamping bolts cannot be removed in a normal way and must be cut through so that the block members and axle can be removed from the frame. This necessitates costly reworking of the frame in order to remove the severed bolts. The latter construction is also relatively costly to manufacture.

The present invention overcomes the foregoing disadvantages in utilizing pairs of parallel frame members on opposite sides of the vehicle and a short wheel mounting axle mounted impositively between each pair of frame members for supporting the one end of the vehicle. Opposite ends of each impositively mounted axle are formed with flat side portions which are received in mating cut out sections of the frame members. Preferably each cut out section of the frame members is of generally trapezoidal configuration with the sides thereof converging upwardly so as to form a locking angle with matching flat sides of the respective axle end. Alternatively the cut out sections need not form a locking angle with respective end portions of the axle, in which event I provide at least one pin or equivalent means which extends inwardly of one frame member of each pair thereof and into a cavity formed in one side of each wheel so as to prevent the wheel and axle from falling out of the frame during operation of the vehicle. I prefer to combine the holding pin construction with the locking angle construction, although this is not essential to the practice of the invention.

In the use of the combined construction, as aforesaid, it has been found that the wedging forces, which occur in the use of the locking angle, are adequate to maintain the axle in position under normal operating conditions. Under some circumstances, however, the vehicle may be driven partially beyond the end of a loading dock or elevator, for example, whereby each suspended wheel tends to be loosened from its wedging relation to the frame and disengage itself therefrom. In such event the aforementioned pin means prevents the wheels and axle from becoming disengaged. Of course if the construction does not provide a locking angle the pin means alone prevents disengagement.

As will become more apparent following a detailed description of the invention, I have developed an axle and wheel mounting construction which is not only economical to manufacture, but which avoids the difficulties heretofore experienced in the use of prior constructions, as discussed above.

It is therefore a principle object of the invention to provide an axle mounting which is not materially affected by corrosion and which is relatively low in manufacturing cost.

Another object of the invention is to provide a generally improved non-traction axle mounting construction for certain types of vehicles.

A further object of the invention is to provide a quickly demountable non-traction axle and wheel unit.

The above and other objects and features of the present invention will become more readily apparent from the following detailed description of an illustrative embodiment thereof when taken in conjunction with the accompanying drawings forming a part hereof and wherein:

Figure 1 is a partial sectional, broken-away side view of one type of material handling machine with which the present invention has utility;

Figure 2 is an enlarged broken-away side elevational view of the non-traction axle mounting construction of the present invention; and Figure 3 is a sectional view taken along line 3—3 of Figure 2.

Referring now in detail to the drawings, there is illustrated in Figure 1 the forward or load platform portion of a low lift platform hand truck of a type described in detail in my co-pending U.S. application Serial No. 764,043, filed September 29, 1958 (common assignee). As described in the co-pending application the main frame 10 of the truck is supported by means of a single motor operated steering and driving wheel (not shown) which is located adjacent the opposite end of the truck to that shown, and which has connected thereto an upwardly extending steering handle on which is located suitable motor control means. The main frame 10 has rigidly secured thereto at its forward edge pairs of spaced forwardly projecting load supporting frames, one of which is indicated generally at numeral 12, which form extensions of the main frame 10 and which are connected together at the forward ends by a transverse frame member 14 to form a rigid unitary structure. Each frame 12 comprises a pair of parallel side plates 16 which are secured together in laterally spaced relationship by means of transversely extending plates 18. The entire frame structure may be conveniently secured together by means of welding or by any other suitable means.

The pairs of load supporting frames 16, only one of which is illustrated, it being understood that such frame construction is present on opposite sides of the truck, are each supported adjacent their forward ends by a wheel and axle construction which, in combination with the frame members 16 comprises the present invention, to be described in detail hereinbelow. Thus, the entire framework of the truck and associated mechanism is supported for movement over the ground or other supporting surface by means of a single driving and steering wheel and two trail wheels.

Mounted for vertical movement relative to the load supporting frames 12 is a conventional type of horizontally extending load support platform 20 having a downwardly turned flange 22 forwardly thereof and an upwardly turned flange 24 rearwardly thereof. The platform is mounted for movement vertically and slightly longitudinally of the frame members 12 by means of transversely spaced pairs of pivotally connected links 26 and 28, only one link of each pair being illustrated in Figure 1. The pivotal connection of the pairs of links to the load supporting frame structure and to the platform 20 forms a parallelogram linkage arrangement which permits the platform to move vertically relative to the frame structure while maintaining its horizontal disposition.

In order to accomplish movement of the platform relative to the frame structure, a hydraulically actuated cylinder and piston assembly 30 is provided. The base end of the cylinder is pivotally connected centrally to the load supporting frame structure by means of a pivot shaft 32, and the piston rod extends rearwardly to be connected with a transverse shaft 34 upon the opposite ends of which are carried roller means, one of which is illustrated at numeral 36. A third roller, not shown, is located on shaft member 34 intermediate rollers 36. Cam elements 38 and 40 are connected, respectively, to the platform 20 and to the frame structure and are adapted to cooperate with the various rollers located on shaft 34 so that as the piston rod of the cylinder assembly 30 extends the rollers will engage the sloping surfaces of the cam elements, thereby causing a wedging action which tends to force the cams apart so that the platform 20 moves vertically and longitudinally relative to the load supporting frame and on the one ends of the pairs of links 26 and 28. The actuating and support mechanism of lifting platform 20 comprises the invention of the aforementioned co-pending application and is described in detail therein. Inasmuch as it forms no part of the present invention, it has been only generally described herein in order to supply an exemplary environment in which the present invention may be utilized.

Referring now in greater detail to the axle and wheel mounting construction, it will be noted that a non-traction trail wheel 50 of known construction is mounted upon a pair of ball bearings 52 which are in turn supported by an axle 54 having laterally spaced grooves 56 formed therein for receiving split rings 58. Split rings 60 are also received in laterally spaced grooves formed in the inner periphery of each wheel such that when assembled the wheel, bearings and axle form a unitary construction wherein the wheel is rotatable on said bearings and about the axis of the axle.

As illustrated the lower side of each frame member 16 is cut out to form a generally trapezoidal opening 62 which is preferably formed such that the included angle between upwardly converging sides 64 is less than 17° and greater than 0° to provide a locking angle. The sides of each end of axle 54 are machined to provide upwardly converging flat surfaces 66 having a matching included angle the same as provided by the sides of opening 62. Each wheel and axle assembly may be secured to a pair of frame members 16 merely by the wedging action which is provided between the sides 64 and 66 of the frame and axle, respectively. Each wheel 50 is maintained in proper spaced relation to and intermediate frame members 16 by the shoulders 68 formed adjacent the ends of each shaft 54. As pointed out above, under normal operating conditions the mere provision of such a locking angle is adequate to maintain each axle in proper position in the frame by wedging action.

If desired, a pin member 70 or equivalent element may be utilized in addition to the locking angle construction to provide a somewhat more positive means for maintaining each axle assembly in position. Member 70 is preferably a relatively short pin member which extends only a small distance beyond one frame member 16 of each pair thereof and into an axially extending cavity 72 of the wheel. As shown, the pin member is located in spaced relation to the peripheral surface of the cavity 72 to prevent unnecessary wear in operation. In the use of the latter construction, which I prefer, the wheel and axle assembly cannot disengage itself from the frame even in the abnormal circumstance in which the wedging forces between surfaces 64 and 66 are inadequate to hold the assembly in position. Conceivably the latter condition could occur if the wheels 50 were driven beyond the end of a supporting floor or dock. In such a circumstance pin member 70 will abut the outer peripheral portion of cavity 72 thereby preventing the possibility of the wheel dropping completely out of the frame. Then, when the wheels are relocated on a supporting surface, the axle ends are automatically guided into mating relationship to the cut out sections 62. If desired, of course, wheel 50 may be formed to provide a cavity 72 on each side thereof and a pair of pin members 70 associated with opposite sides of each wheel in the foregoing manner, although it has been found in practice that such a construction is not required.

Alternatively, I have found that the use alone of one or more pin members 70 with each wheel meets all normal operating requirements in vehicles of the type contemplated, and that a locking angle need not be provided in the formation of surfaces 64 and 66. If, for example, these surfaces did not converge but were parallel to each other they would serve only as locating means for the wheel 50, not as impositive locking means. In such construction it has been found in practice that pin member 70 alone is sufficient to hold the wheel and axle assembly in proper supporting relation to the frame members 16.

In order to remove the axle and wheel assembly from the machine in constructions utilizing pin member 70 and a lock angle support, the pin is driven into the cavity 72 in the wheel until it clears the frame member and falls free. The wheel is then struck from the top with sufficient force to overcome the wedging action. In the event the pin is corroded it can be readily drilled out of the frame and replaced during reassembly with no damage to the frame. Of course, if either pin or locking angle construction alone is used, then it is necessary only

I claim:

1. An axle and wheel mounting for vehicles comprising a pair of parallel frame members, an open trapezoidal portion formed by each frame member opening in a downward direction, an axle, and a wheel mounted upon the axle, opposite ends of said axle being formed to mate with the upwardly converging sides of said open trapezoidal portion, said mating sides forming an included locking angle between the axle and frame members of less than 17° and greater than 0° for retaining the axle and wheel assembly in operative relation to the frame members.

2. An axle and wheel mounting for vehicles comprising a pair of parallel frame members on each side of the vehicle, said frame members forming an opening opening downwardly thereof and having upwardly converging sides, a pair of axles, a wheel mounted upon each said axle, end portions of each axle being formed to provide flat sections on opposite sides of the axle extending upwardly thereof in converging relation, said flat sections being formed to mate in locked and wedging relation with the respective upwardly converging sides of the opening formed by the frame members, the included angle between said converging sides being 16° or less but greater than 0°, whereby each axle and wheel assembly is maintained in operative position to the adjacent frame members by means of the impositive locking relation provided between said flat side end portions of the axle and the mating portions of the frame members.

3. In a vehicle, a pair of horizontally extending parallel frame members, each frame member providing a substantially trapezoidal axle receiving section opening downwardly thereof, the sides of which extend upwardly in converging relation, an axle, a non-traction vehicle supporting wheel mounted upon the axle, said axle being non-rotatable and having the ends thereof formed to provide flat surfaces matable with the said upwardly converging sides of the frame members, said mated surfaces of the axle and frame members forming an included wedge locking angle of less than 17° and greater than 0° for maintaining the axle and wheel assembly in supporting position relative to the frame members.

4. An axle and wheel construction for vehicles having a pair of horizontally extending frame members comprising a wheel having an axially extending cavity formed in one side thereof, a non-rotatable axle, bearing means supporting the wheel on said axle, said axle having upwardly converging flats formed on opposite sides of each end portion, said frame members being adapted to receive therein said upwardly converging flats whereby to provide a wedging connection between the axle and frame members, and means extending inwardly from one of said frame members and into said wheel cavity for preventing the axle and wheel assembly from disengaging itself from said frame members.

5. A construction as claimed in claim 4 wherein said latter means extends only partially inwardly of said wheel cavity and is normally located in spaced relation to the wheel surface forming said cavity.

6. A construction as claimed in claim 4 wherein the axle receiving portion of each frame member comprises a downwardly diverging and generally trapezoidal portion having sides mating with said axle ends forming an included angle therebetween which is less than 17° and more than 0°.

7. In combination, a pair of wheel supporting members, a non-rotatable axle, each end portion of said axle having sides formed to provide upwardly converging flat surfaces, each supporting member having formed therein a downwardly opening opening having sides formed for mating relation with the flat sides of one end of the axle, said mating sides forming thereby a wedge lock between the supporting members and the ends of the axle, a wheel mounted for rotation upon the axle intermediate the supporting members, one side of the wheel forming an axially extending cavity, and a pin member extending through one of the supporting members and axially inwardly of the wheel in radially spaced relation to the surface forming said cavity.

8. An axle and wheel construction for vehicles having a pair of horizontally extending frame members comprising a wheel having an axially extending cavity formed in one side thereof, a non-rotatable axle, said axle having flats formed on opposite sides of each end portion, said frame members being adapted to receive therein said flats whereby to provide a locating connection between the axle and frame members, and means extending inwardly from one of said frame members and into said wheel cavity for preventing the axle and wheel assembly from disengaging itself from said frame members.

9. A construction as claimed in claim 8 wherein said latter means extends only partially inwardly of said wheel cavity and is normally located in spaced relation to the wheel surface forming said cavity.

10. In combination, a pair of wheel supporting members, a non-rotatable axle, each end portion of said axle having sides formed to provide flat surfaces, each supporting member having formed therein a downwardly opening opening having sides formed for mating relation with the flat sides of one end of the axle, a wheel mounted for rotation upon the axle intermediate the supporting members, one side of the wheel forming an axially extending cavity, and a pin member extending through one of the supporting members and axially inwardly of the cavity.

References Cited in the file of this patent

UNITED STATES PATENTS

| | | |
|---|---|---|
| 1,930,379 | Bennett | Oct. 10, 1933 |
| 2,397,296 | Scribner | Mar. 26, 1946 |
| 2,699,953 | Chaddick | Jan. 18, 1955 |

UNITED STATES PATENT OFFICE
CERTIFICATION OF CORRECTION

Patent No. 2,967,074                      January 3, 1961.

William A. Williamson

It is hereby certified that error appears in the above numbered patent requiring correction and that the said Letters Patent should read as corrected below.

Column 1, line 19, for '"wa k e"' read -- "walkie" --.

Signed and sealed this 9th day of May 1961.

(SEAL)
Attest:

ERNEST W. SWIDER                      DAVID L. LADD

Attesting Officer                      Commissioner of Patents